United States Patent
Murashima

(10) Patent No.: US 8,115,957 B2
(45) Date of Patent: Feb. 14, 2012

(54) DATA TRANSMITTING APPARATUS AND DATA TRANSMITTING PROGRAM

(75) Inventor: Hiroshi Murashima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 724 days.

(21) Appl. No.: 12/181,307

(22) Filed: Jul. 28, 2008

(65) Prior Publication Data

US 2009/0033991 A1   Feb. 5, 2009

(30) Foreign Application Priority Data

Jul. 31, 2007 (JP) ................. 2007-198901

(51) Int. Cl.
 *G06F 3/12* (2006.01)
 *G06K 1/00* (2006.01)
 *B41J 2/21* (2006.01)
(52) U.S. Cl. ............ 358/1.15; 358/19; 347/43
(58) Field of Classification Search .......... 358/1.9, 358/1.15; 347/43
 See application file for complete search history.

(56) References Cited

U.S. PATENT DOCUMENTS 6,972,868 B1 * 12/2005 Gondek et al. ............ 358/1.9
2007/0139470 A1 * 6/2007 Lee ........................... 347/43

FOREIGN PATENT DOCUMENTS

| JP | H05-270092 A | 10/1993 |
| JP | H10-191033 A | 7/1998 |

* cited by examiner

*Primary Examiner* — Charlotte M Baker
*Assistant Examiner* — Justin Katzwhite
(74) *Attorney, Agent, or Firm* — Baker Botts L.L.P.

(57) ABSTRACT

In a data transmission apparatus, each dot data element is one of a predetermined number of kinds. The data transmitting apparatus includes a template-data generating portion generating template data from the image data by initially determining one of the kinds of dot data element that most frequently occurs in each of one of the rows and the columns and then sequencing the most frequently occurring kinds of dot data elements determined in a direction of the other of the rows and the columns, a data-block generating portion generating a data block by sequencing in the direction of the other of the rows and the columns codes each indicative of a difference between one of the dot data elements of a kind in the image data as stored in the storing portion and one of the dot data elements of a kind in the template data.

9 Claims, 10 Drawing Sheets

MAIN SCANNING DIRECTION

AUXILIARY SCANNING DIRECTION

FIG.8

| | | #1 | #2 | #3 | #4 | #5 | #6 | #7 | | #662 | #663 | #664 |
|---|---|---|---|---|---|---|---|---|---|---|---|---|
| IMAGE DATA (CORRESPONDING TO ONE CYCLE OF INK EJECTION) | | N | S | S | S | S | M | M | | S | N | N |
| TEMPLATE DATA | | N | S | S | S | S | S | S | | N | N | N |
| HEAD DATA BLOCK | | 00 | 00 | 00 | 00 | 00 | 01 | 01 | | 01 | 00 | 00 |

FIG.10

|  | 1ST TIME | 2ND TIME | 3RD TIME | 4TH TIME | 5TH TIME | 6TH TIME | 7TH TIME | | nTH TIME | |
|---|---|---|---|---|---|---|---|---|---|---|
| IMAGE DATA (CORRESPONDING TO ONE NOZZLE) | N | S | S | S | S | M | M | S | N | N |
| TEMPLATE DATA | N | S | S | S | S | S | S | N | N | N |
| HEAD DATA BLOCK | 00 | 00 | 00 | 00 | 00 | 01 | 01 | 01 | 00 | 00 |

DATA TRANSMITTING APPARATUS AND DATA TRANSMITTING PROGRAM

CROSS REFERENCE TO RELATED APPLICATION

The present application claims priority from Japanese Patent Application No. 2007-198901, which was filed on Jul. 31, 2007, the disclosure of which is herein incorporated by reference in its entirety.

BACKGROUND OF THE INVENTION

1. Field of the Invention

The present invention relates to a data transmitting apparatus and a data transmitting program for transmitting data related to an image to an inkjet recording apparatus.

2. Description of Related Art

The resolution of an image recorded by an inkjet recording apparatus or an inkjet printer is getting higher and higher, which leads to increase in an amount of image data handled by the inkjet printer. On the other hand, there is a demand for reducing a time necessary to transmit image data to an inkjet printer of high print rate, such as those having an inkjet head of line type extending across a width of a recording medium, i.e., extending perpendicular to a medium feeding direction along which a recording medium is fed. To meet this demand, it is known to compress image data and transmit the compressed data to the inkjet printer, thereby reducing an amount of data transmission and accordingly the time necessary for the data transmission.

SUMMARY OF THE INVENTION

This invention has been developed in view of the above-described situations, and it is an object of the invention, therefore, to provide a data transmission apparatus and a data transmission program that can reduce time necessary to transmit data.

To attain the above object, a first aspect of this invention provides a data transmission apparatus for transmitting image data to an inkjet recording apparatus including (a) a feeding device which feeds a recording medium in a feeding direction, and (b) a line-type inkjet head which extends in a direction perpendicular to the feeding direction and across the recording medium fed in the feeding direction, and has an ink ejection surface in which a plurality of ink ejection openings are formed. The image data is related to an image to be recorded on the recording medium by the inkjet recording apparatus, and constituted by a plurality of dot data elements corresponding to respective image dots of the image. The dot data elements are arranged in a matrix of rows and columns that are respectively parallel to a first direction and a second direction with the first direction being perpendicular to the feeding direction and the second direction being parallel to the feeding direction. Each of the dot data elements is one of a predetermined plurality of kinds. The data transmitting apparatus includes: (1) a storing portion which stores the image data; (2) a template-data generating portion which generates template data from the image data stored in the storing portion, by initially determining one of the kinds of dot data element that most frequently occurs in each of one of the rows and the columns, and then sequencing the most frequently occurring kinds of dot data elements determined in a direction of the other of the rows and the columns; (3) a data-block generating portion which generates a data block by sequencing, in the direction of the other of the rows and the columns, codes each indicative of a difference between one of the dot data elements of a kind in the image data as stored in the storing portion and one of the dot data elements of a kind in the template data which corresponds to the one dot data element in the image data; (4) a compressing portion which compresses the data block generated by the data-block generating portion to create a compressed file; and (5) a transmitting portion which transmits the compressed file to the inkjet recording apparatus.

In a preferable form of the data transmission apparatus, the columns are respectively associated with the ink ejection openings, the template-data generating portion initially determines the kind of dot data element that most frequently occurs in each of the columns and then sequences the kinds of dot data elements to correspond to at least a part of the ink ejection openings, and the data-block generating portion generates the data block such that the codes are sequenced to correspond to one cycle of ink ejection in recording of the image on the recording medium by the inkjet recording apparatus.

A second aspect of the invention provides a data transmission program for having a computer transmit image data to an inkjet recording apparatus including (a) a feeding device which feeds a recording medium in a feeding direction, and (b) a line-type inkjet head which extends in a direction perpendicular to the feeding direction and across the recording medium fed in the feeding direction, and has an ink ejection surface in which a plurality of ink ejection openings are formed. The image data is stored in a storing portion of the computer, related to an image to be recorded on the recording medium by the inkjet recording apparatus, and constituted by a plurality of dot data elements corresponding to respective image dots of the image. The dot data elements are arranged in a matrix of rows and columns that are respectively parallel to a first direction and a second direction, with the first direction being perpendicular to the feeding direction and the second direction being parallel to the feeding direction. Each of the dot data elements is one of a predetermined plurality of kinds. The data transmitting program includes: (1) a template-data generating process for generating template data from the image data stored in the storing portion, by initially determining one of the kinds of dot data element that most frequently occurs in each of one of the rows and the columns, and then sequencing the most frequently occurring kinds of dot data elements determined in a direction of the other of the rows and the columns; (2) a data-block generating process for generating a data block by sequencing, in the direction of the other of the rows and the columns, codes each indicative of a difference between one of the dot data elements of a kind in the image data as stored in the storing portion and one of the dot data elements of a kind in the template data which corresponds to the one dot data element in the image data; (3) a compressing process for compressing the data block generated by the data-block generating portion to create a compressed file; and (4) a transmitting process for transmitting the compressed file to the inkjet recording apparatus.

Features applicable to the first aspect of the invention are equally applicable to the present program.

According to the invention, the kind of dot data element that correspond to one of a plurality of sorts of image dots that most frequently occurs in each of one of the image dot columns and the image dot rows is first determined, and the thus determined kinds of dot data elements most frequently occurring in the respective image dot columns or image dot rows are sequenced in the template data, and the data block is constituted by the codes indicative of the differences between the respective dot data elements in the image data and the dot data elements in the template data that respectively correspond to the dot data elements in the image data. Thus, a frequency that a consecutive sequence of a same code occurs in the data block is relatively high, and the compressing portion can accordingly efficiently compress the data block. Therefore, the time necessary to transmit data to the inkjet recording apparatus is reduced.

In particular, in the preferable form where the columns are respectively associated with the ink ejection openings and the template-data generating portion initially determines the kind of dot data element that most frequently occurs in each of the columns and then sequences the kinds of dot data elements to correspond to at least a part of the ink ejection openings, the data-block generating portion generates the data block such that the codes are sequenced to correspond to one cycle of ink ejection in recording of the image on the recording medium by the inkjet recording apparatus. Hence, it is enabled to have the compressing portion compresses the data block each time the data block is generated, or to have the compressing portion compresses a data block group including a predetermined amount of data blocks each time the data block group is obtained. By transmitting the thus created compressed file by the transmitting portion, recording of an image in the inkjet recording apparatus and transmission of image data of the image can be simultaneously performed, at least partly. Hence, the efficiency in the recording of the image can be enhanced.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which:

FIG. 8 illustrates an example of a data conversion that a data-block generating portion shown in FIG. 1 implements to generate a head data block;

FIG. 10 illustrates another example of the data conversion that the data-block generating portion implements.

DETAILED DESCRIPTION OF PREFERRED EMBODIMENTS

Hereinafter, there will be described a control apparatus as a data transmitting apparatus according to one presently preferred embodiment of the invention, by referring to the accompanying drawings.

Figure 1:
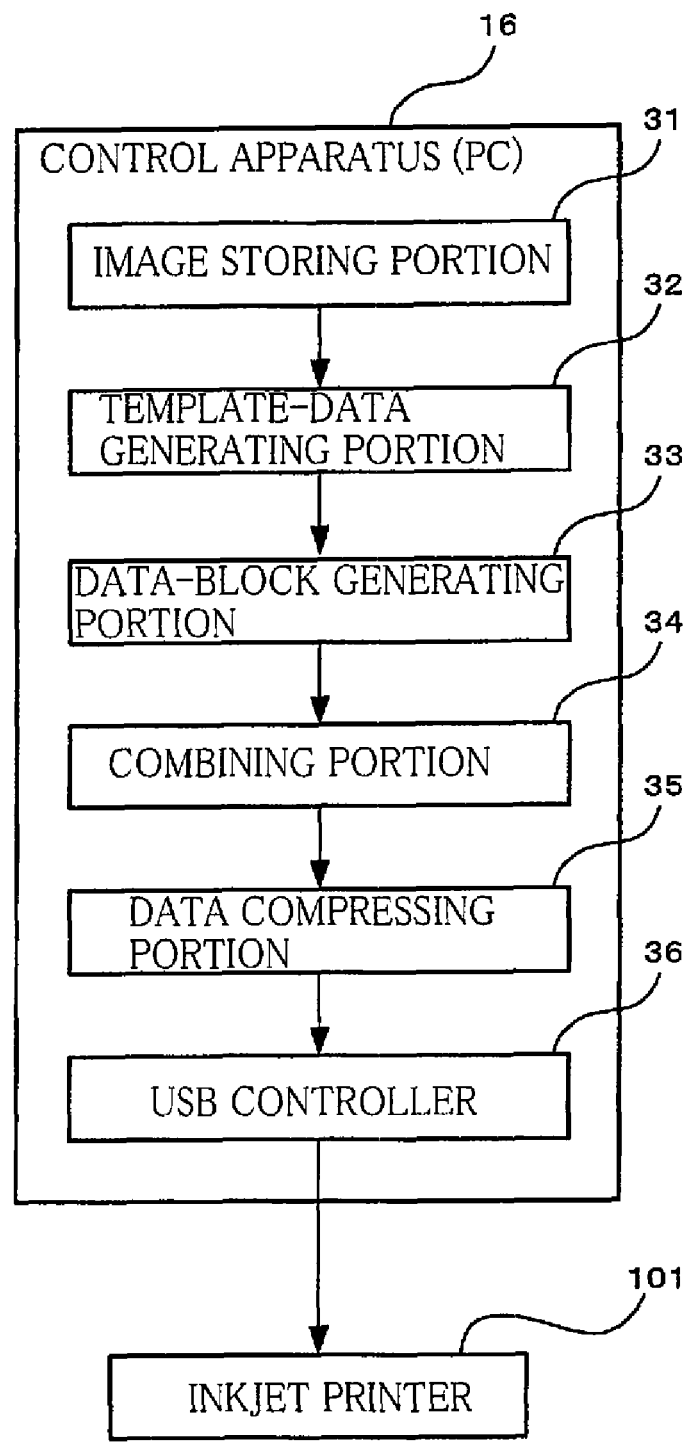
FIG. 1 is a functional block diagram of a control apparatus according to one embodiment of the invention.

The control apparatus, which is denoted by reference numeral 16 in FIG. 1, takes the form of a PC (Personal Computer) that executes a control program. The PC includes a CPU (Central Processing Unit), a ROM (Read Only Memory), a RAM (Random Access Memory), and a HDD (Hard Disk Drive). The CPU executes the control program to implement the functional portions of the control apparatus 16 as described later. The control apparatus 16 operates to control an operation of an inkjet printer 101, and is connected by USB with the inkjet printer 101 such that communication therebetween is possible. The control apparatus 16 has a function to send the inkjet printer 101 image data related to an image to be recorded on a recording sheet P (shown in FIG. 2) by the inkjet printer 101, that is, a function as a data transmitting apparatus, as well as a function to control the inkjet printer 101 to record the image of the image data in response to an instruction from a user. Hereinafter, the function of the control apparatus 16 as a data transmitting apparatus will be mainly described.

Figure 2:
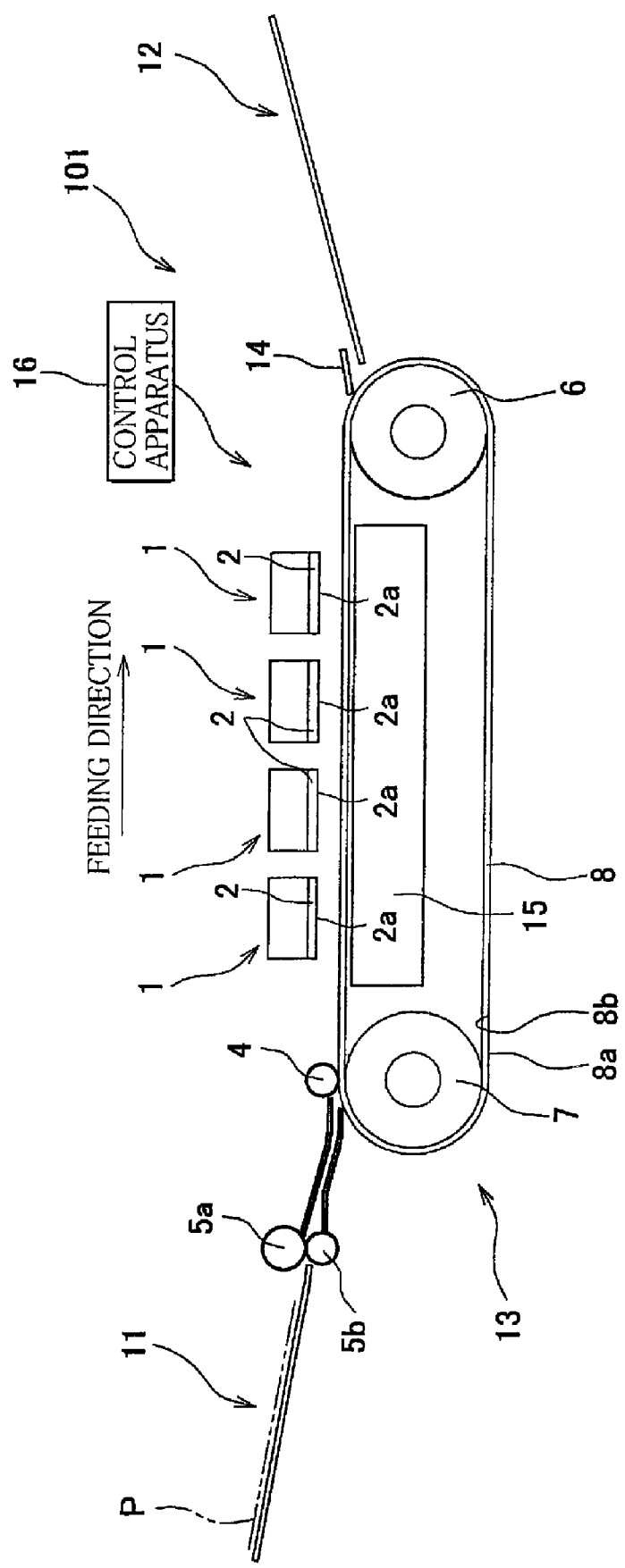
FIG. 2 is a schematic side view of an inkjet printer shown in FIG. 1.

There will be described the inkjet printer 101 as an object of control by the control apparatus 16, with reference to FIG. 2 which is a schematic side view of the inkjet printer 101. As shown in FIG. 2, the inkjet printer 101 is a color inkjet printer having four inkjet heads 1. At a left side and a right side of the inkjet printer 101, a sheet supply tray 11 and a sheet catch tray 12 are disposed, respectively.

Inside the inkjet printer 101 is formed a sheet feed path along which the recording sheet P is fed from the sheet supply tray 11 to the sheet catch tray 12. At a position immediately downstream of the sheet supply tray 11 with respect to a direction of feeding of recording sheet (hereinafter referred to as "feeding direction"), a pair of feeder rollers 5a, 5b are disposed to nip therebetween and feed a recording sheet. At a middle portion of the sheet feed path, a belt feeding mechanism or a feeding device 13 is disposed. The belt feeding mechanism 13 includes two belt rollers 6, 7, an endless feeder belt 8 wound and entrained around the belt rollers 6, 7, and a platen 15 disposed inside a circle of the feeder belt 8 and at a position opposed to the inkjet heads 1. The platen 15 functions to support the feeder belt 8 at an area opposed to the inkjet heads 1 so as to prevent sagging of the feeder belt 8. Adjacent to the belt roller 7 is disposed a nip roller 4, which presses the recording sheet P as fed out from the sheet supply tray 11 by the feeder rollers 5a, 5b, against an outer circumferential surface 8a of the feeder belt 8.

The feeder belt 8 is circulated by the belt roller 6 being rotated by a feed motor (not shown). By the circulation of the feeder belt 8, the recording sheet P is fed toward the sheet catch tray 12 such that the recording sheet P is pressed onto the outer circumferential surface 8a of the feeder belt 8 by the nip roller 4 and thus adhesively held thereon.

At a position immediately downstream of the feeder belt 8 with respect to the feeding direction, a sheet separating mechanism 14 is disposed. The sheet separating mechanism 14 functions to separate from the outer circumferential surface 8a of the feeder belt 8 the recording sheet P adhesively held thereon, and feed the recording sheet onto the sheet catch tray 12 at the right side as seen in FIG. 2.

The inkjet heads 1 respectively correspond to four inks of different colors, namely, magenta, yellow, cyan and black, and are disposed along the feeding direction. That is, the inkjet printer 101 is a line-type printer. Each of the four inkjet heads 1 has a main body 2 at a lower end thereof. The main body 2 of the inkjet head 1 has the shape of a rectangular parallelepiped long in a direction perpendicular to the feeding direction of the recording sheet P. An under surface of the main body 2 of the inkjet head 1 includes an ink ejection surface 2a opposed to the outer circumferential surface 8a of the feeder belt 8. When the recording sheet P being fed by the feeder belt 8 passes by immediately under an array of the main bodies 2 of the inkjet heads 1, the inks of respective colors are ejected from the ink ejection surface 2a onto an upper surface, or a recording surface, of the recording sheet P, thereby forming a desired color image on the recording surface of the recording sheet P.

Figure 3:
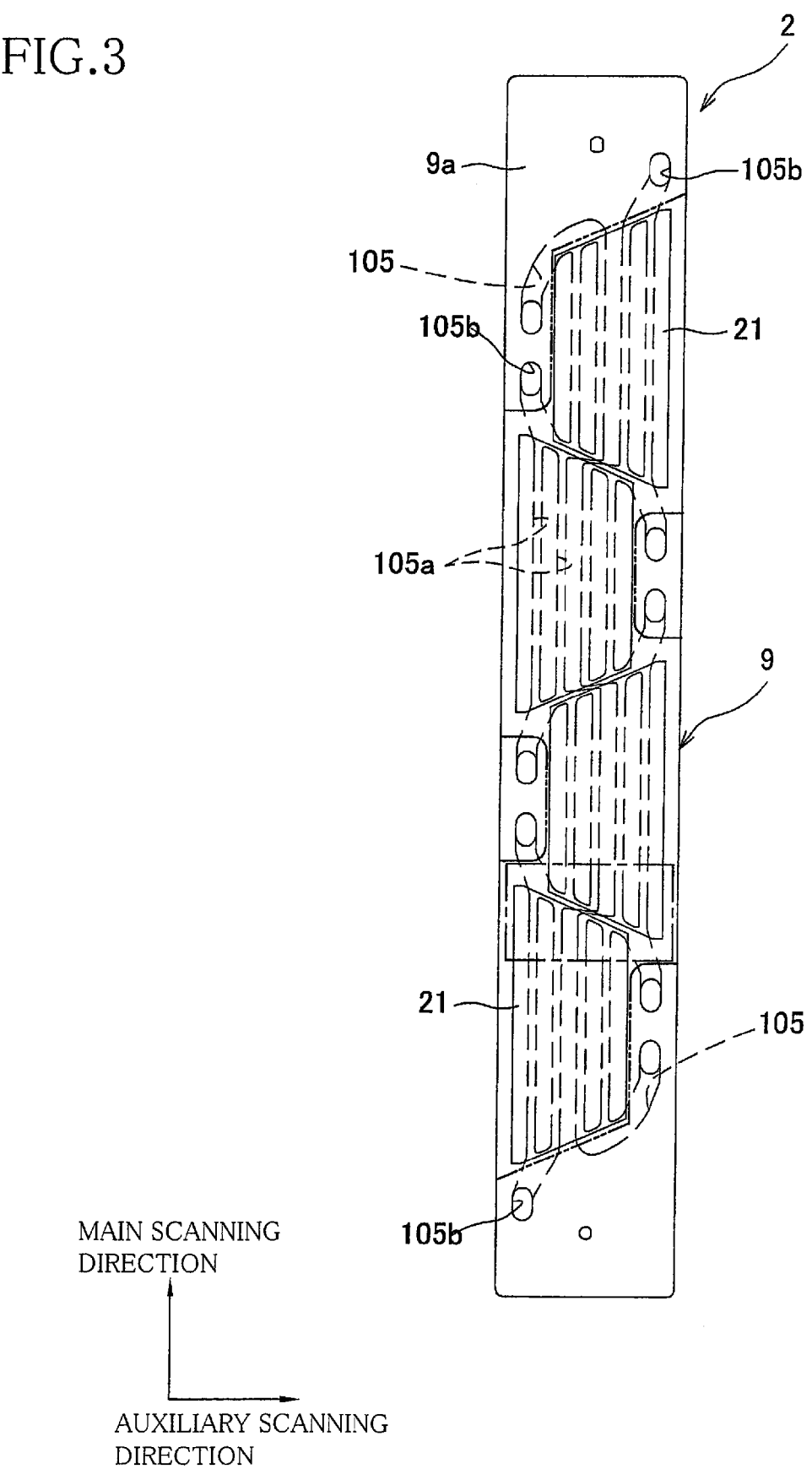
FIG. 3 is a plan view of a main body of an inkjet head shown in FIG. 2.
Figure 4:
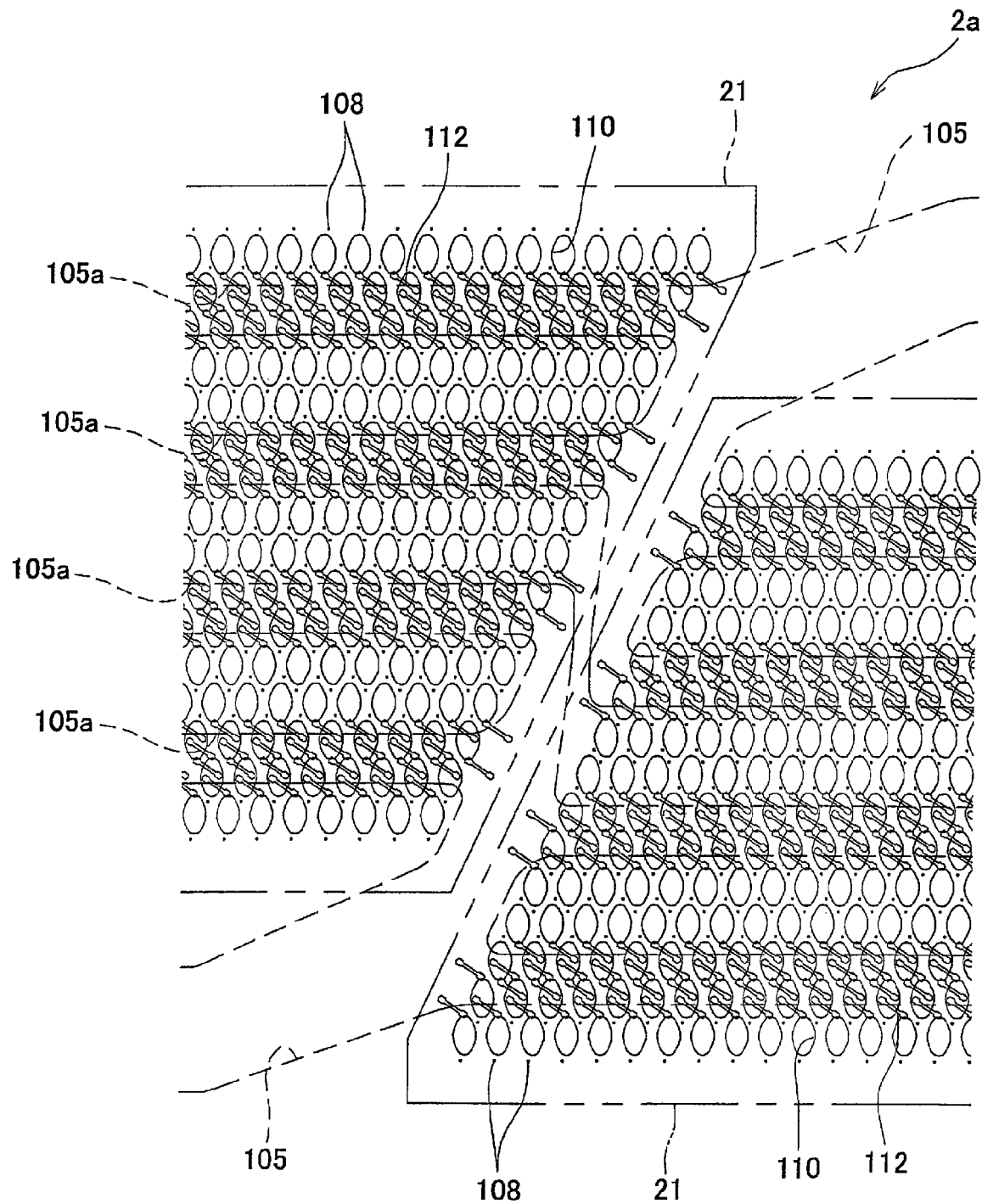
FIG. 4 shows in enlargement a part of FIG. 3 enclosed by dashed line.

There will be described the inkjet head 1 by referring to FIGS. 3 and 4, in which FIG. 3 is a plan view of the inkjet head 1 and FIG. 4 shows in enlargement a part of FIG. 3 enclosed by dashed line. In FIG. 4, pressure chambers 110, apertures 112, and the nozzles 108 that are disposed below actuator units 21 and supposed to be indicated by broken line are actually indicated by solid line, for the sake of convenience. The inkjet head 1 has the main body 2 and a reservoir unit (not shown). The reservoir unit is disposed on an upper surface of the main body 2 of the inkjet head 1, which is a surface on the side opposite to the feeder belt 8, and stores an ink to be supplied to the main body 2 of the inkjet head 1.

As shown in FIGS. 3 and 4, the main body 2 of the inkjet head 1 includes four actuator units 21 and a fluid passage unit 9. The four actuator units 21 are fixed on an upper surface 9a of the fluid passage unit 9, which is a surface on the side opposite to the feeder belt 8. The fluid passage unit 9 has the shape of a parallelepiped and is rectangular in plan view. In the upper surface 9a of the fluid passage unit 9 are open ink ports 105b ten in total, through which the ink is taken into the fluid passage unit 9 from the reservoir unit. Inside the fluid passage unit 9 are formed manifold passages 105 in communication with the ink ports 105b, sub manifold passages 105a diverging from the manifold passages 105, and a large number of individual ink passages 132 each extending from an end of one of the sub manifold passages 105a to one of the nozzles 108 via a corresponding one of the pressure chambers 110. The ink ejection surface 2a in which a large number of nozzles 108 are arranged in matrix is formed on an under surface of the fluid passage unit 9, which is a surface on the side of the feeder belt 8.

On the upper surface 9a of the fluid passage unit 9, recesses that are to become the pressure chambers 110 are formed. Each of the recesses has a rhomboid shape with rounded corners. The recesses are arranged at regular intervals in a matrix having 16 recess rows each extending in a longitudinal direction of the main body 2 of the inkjet head 1, which is perpendicular to the feeding direction and is parallel to the main scanning direction. More specifically, the recesses are arranged in a staggered manner in a widthwise direction of the main body 2 of the inkjet head 1 such that as seen in the main scanning direction, each recess is disposed between two recesses on respective recess rows adjacent to, and on the opposite sides of, the recess row on which the recess is disposed. That is, 16 recess rows are opposed to each actuator unit 21, and all the recesses included in the actuator unit 21 are disposed within an area having a shape or an outline similar to that of the actuator unit 21.

There will be described how the ink flows in the fluid passage unit 9. The ink supplied from the reservoir unit into the fluid passage unit 9 through the ink ports 105b flows along the manifold passages 105 and then along the sub manifold passages 105a diverging from the manifold passages 105. Out of the sub manifold passages 105a, the ink flows into individual ink passages 132 and then flows along the individual ink passages 132 to reach the nozzles 108 via the apertures 112 functioning as a flow restrictor and the pressure chambers 110.

There will be described the actuator unit 21. As shown in FIG. 3, the four actuator units 21 each having a trapezoidal shape in plan view are arranged in a staggered manner to circumvent the ink ports 105b. The actuator units 21 are disposed such that the two opposing sides parallel to each other in the trapezoidal shape of the actuator unit 21 extend along a longitudinal direction of the fluid passage unit 9. Two adjacent oblique sides of each two adjacent actuator units 21a, that is, an oblique side of an actuator unit 21 and an oblique side of an adjacent actuator unit 21 which oblique sides extend side by side, overlap each other with respect to a width direction of the fluid passage unit 9, which corresponds to an auxiliary scanning direction in the inkjet printer 101.

The actuator unit 21 includes a plurality of actuators corresponding to the pressure chambers 110, and has a function to selectively give ejection energy to the ink in the pressure chambers 110. More specifically, the actuator unit 21 is formed of three piezoelectric sheets made of lead zirconate titanate (PZT) ceramics having ferroelectricity each of the piezoelectric sheets has a size to extend across a plurality of pressure chambers 110. On a topmost one of the piezoelectric sheets and at positions corresponding to the pressure chambers 110, individual electrodes are formed. Between the topmost and the second topmost piezoelectric sheets is interposed a grounding electrode formed across an entire surface of the sheets.

In the common electrode, the ground potential is equally given at the positions corresponding to all the pressure chambers 110. On the other hand, to the individual electrodes a drive signal is selectively inputted from a driver IC (not shown). Thus, in the actuator unit 21, portions sandwiched between the individual electrodes and the pressure chambers 110 function as individual actuator elements. That is, there are formed actuator elements of the same number as the pressure chambers 110.

There will be described how the actuator unit 21 is driven. The actuator unit 21 is of unimorph type in which the upper one of the piezoelectric sheets, i.e., the piezoelectric sheet remote from the pressure chambers 110, is an active layer, and the lower two of the piezoelectric sheets, i.e., the two piezoelectric sheets on the side of the pressure chambers 110, are inactive layers. When a voltage pulse is outputted to an individual electrode, the portion of the piezoelectric sheet corresponding to the individual electrode deforms to pressurize the ink inside the pressure chamber 110, that is, ejection energy is given to the ink in the pressure chamber 110, whereby an ink droplet is ejected from the nozzle 108.

Figure 5:
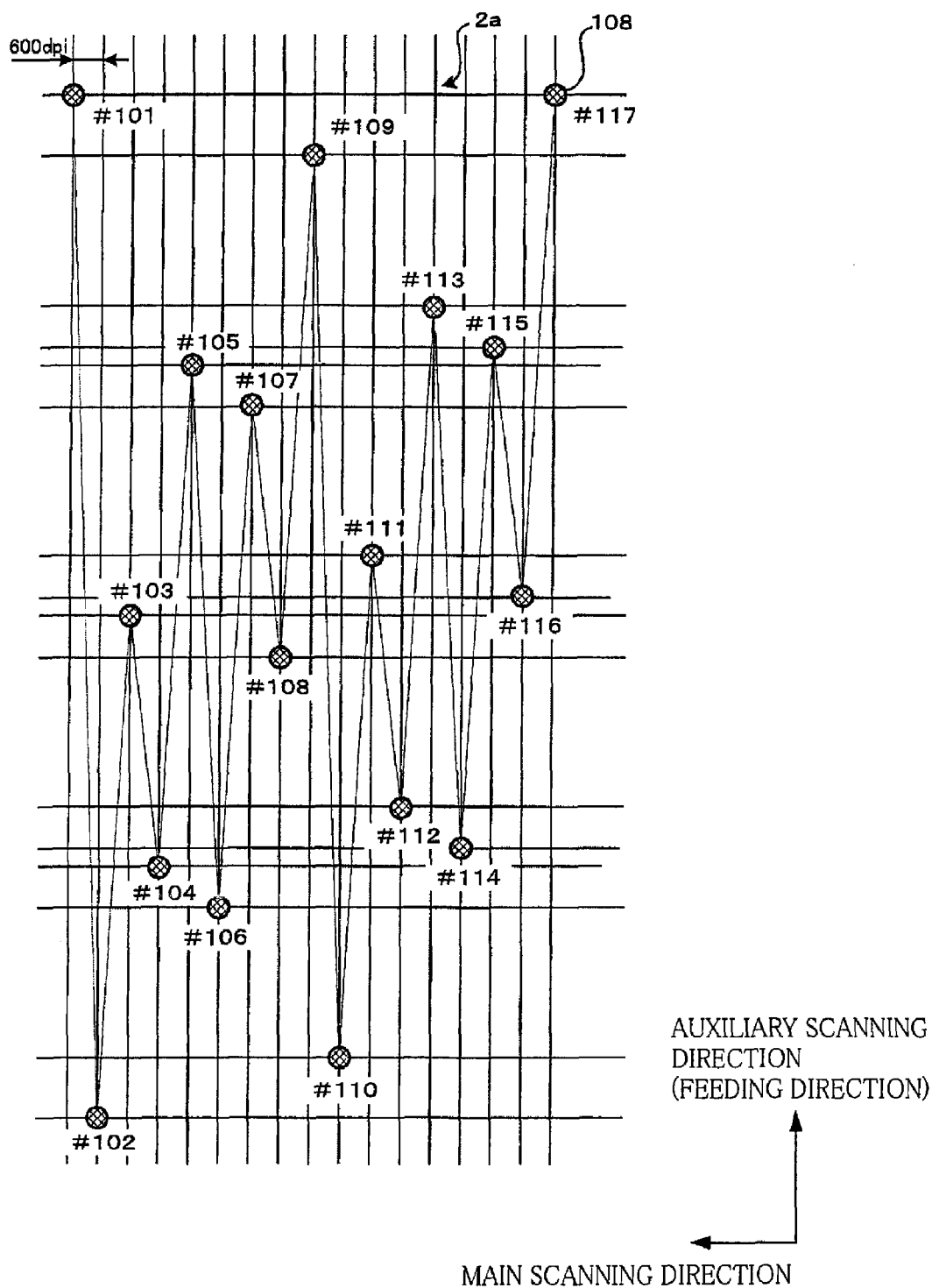
FIG. 5 shows in enlargement a part of an ink ejection surface shown in FIG. 4.

Referring to FIG. 5, there will be described disposition of the nozzles 108 in the ink ejection surface 2a. FIG. 5 is an enlarged view of a part of the ink ejection surface 2a and shows a positional relationship among the nozzles 108. In FIG. 5, a left-right direction corresponds to a main scanning direction which is perpendicular to the feeding direction, and a vertical direction corresponds to an auxiliary scanning direction that is along the feeding direction. In addition, the scale of enlargement differs between the main scanning direction and the auxiliary scanning direction in FIG. 5, for convenience of illustration.

As shown in FIG. 5, on the ink ejection surface 2a, the nozzles 108 are arranged in the main scanning direction and the auxiliary scanning direction to form a matrix. That is, the nozzles 108 are arranged on imaginary lines extending parallel to one another along the main scanning direction as well as on imaginary lines extending parallel to one another along the auxiliary scanning direction, and nozzles on each imaginary line extending along the auxiliary scanning direction are arranged at regular intervals with respect to the main scanning direction. FIG. 5 shows a unit of the nozzle arrangement. More specifically, on a topmost one of the imaginary lines extending in the main scanning direction, two nozzles 108, namely, nozzles #101 and #117, are disposed adjacent to each other, and 15 nozzles 108, namely, nozzles #102-#116, are disposed between the nozzles #101 and #117 with respect to the main scanning direction and on the respective other imaginary lines extending along the main scanning direction. Thus, in each unit of the nozzle arrangement, 16 nozzles 108 (#101-#116) are disposed each on one of 16 imaginary lines extending parallel to one another along the main scanning direction. The 16 nozzles 108 in the unit of the nozzle arrangement, which are arranged in the main scanning direction at regular intervals such that the positions of the 16 nozzles 108 in the main scanning direction differ from one another, correspond to a unit of image forming at a resolution of 600 dpi in the main scanning direction, which is the highest resolution in the main scanning direction. The nozzles 108 are arranged such that a plurality of the units of nozzle arrangement are sequentially arranged in the main scanning direction. As to the auxiliary scanning direction, the imaginary lines arranged in this direction are not equally spaced from one another, but are arranged in a predetermined positional relationship, as shown in FIG. 5.

Figure 7:
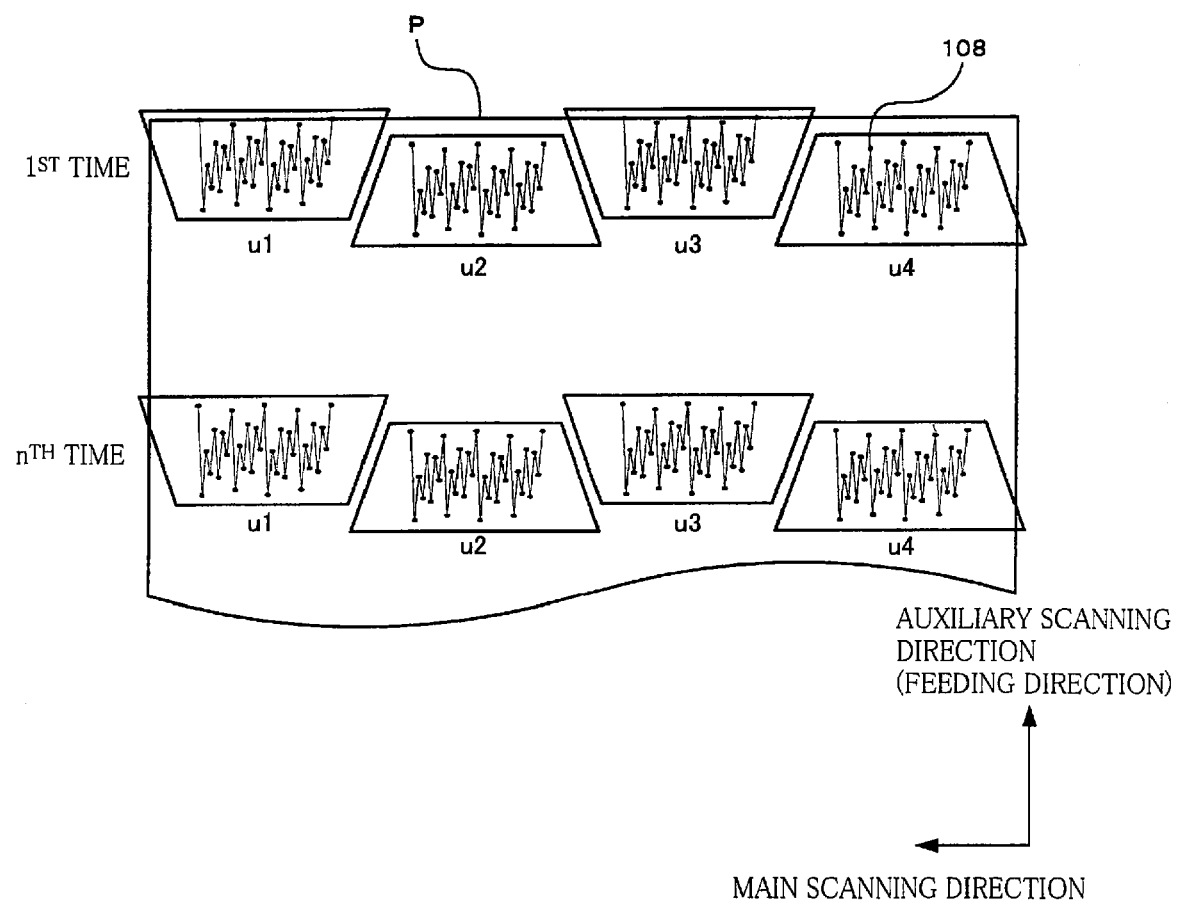
FIG. 7 illustrates a relationship between the image data of FIG. 6 and an image formed on a recording sheet fed in the inkjet printer.

As described above, four actuator units 21 are arranged in each of the inkjet heads 1, and 664 nozzles 108 numbered 1-664 are arranged with respect to the main scanning direction, on the under surface of each of the actuator units 21. Each 664 nozzles 108 corresponding to one of the four actuator units 21 form a nozzle group u1, u2, u3, u4, as shown in FIG. 7. Thus, in the ink ejection surface 2a of each of the inkjet heads 1, the nozzles 108 of the four groups u1-u4 that total 2656 (664×4) are open.

Each of two nozzles 108 adjacent to each nozzle 108 with respect to the main scanning direction is disposed only on one of the upper side or the lower side with respect to the auxiliary scanning direction (that is, on the upstream side or the downstream side with respect to the feeding direction) of the nozzle 108. In other words, the nozzles 108 are arranged in a staggered manner along the main scanning direction. According to the above-described way of nozzle arrangement, the individual ink passages including the nozzles 108 can be arranged in the fluid passage unit 9 in high density.

Referring back to FIG. 1, there will be described the control apparatus 16. The control apparatus 16 includes an image storing portion 31 (storing portion), a template-data generating portion 32, a data-block generating portion 33, a combining portion 34, a data compressing portion 35 (compressing portion), and a USB controller 36 (transmitting portion). The image storing portion 31 stores image data of an image to be recorded on a recording sheet P by the inkjet printer 101. The image data is supplied from the outside of the control apparatus 16, for instance via a memory card (not shown). The data-block generating portion 32 generates, based on the image data stored in the image storing portion 31, a data block for transmission. The data compressing portion 33 compresses the data block generated by the data-block generating portion 32 by run-length method to create a compressed file. The USB controller 34 transmits the compressed file created by the data compressing portion 33, to the inkjet printer 101.

The image storing portion 31 stores image data of an image to be recorded on a recording sheet P by the inkjet printer 101. The image data is supplied from the outside of the control apparatus 16, for instance via a memory card (not shown).

Figure 6:
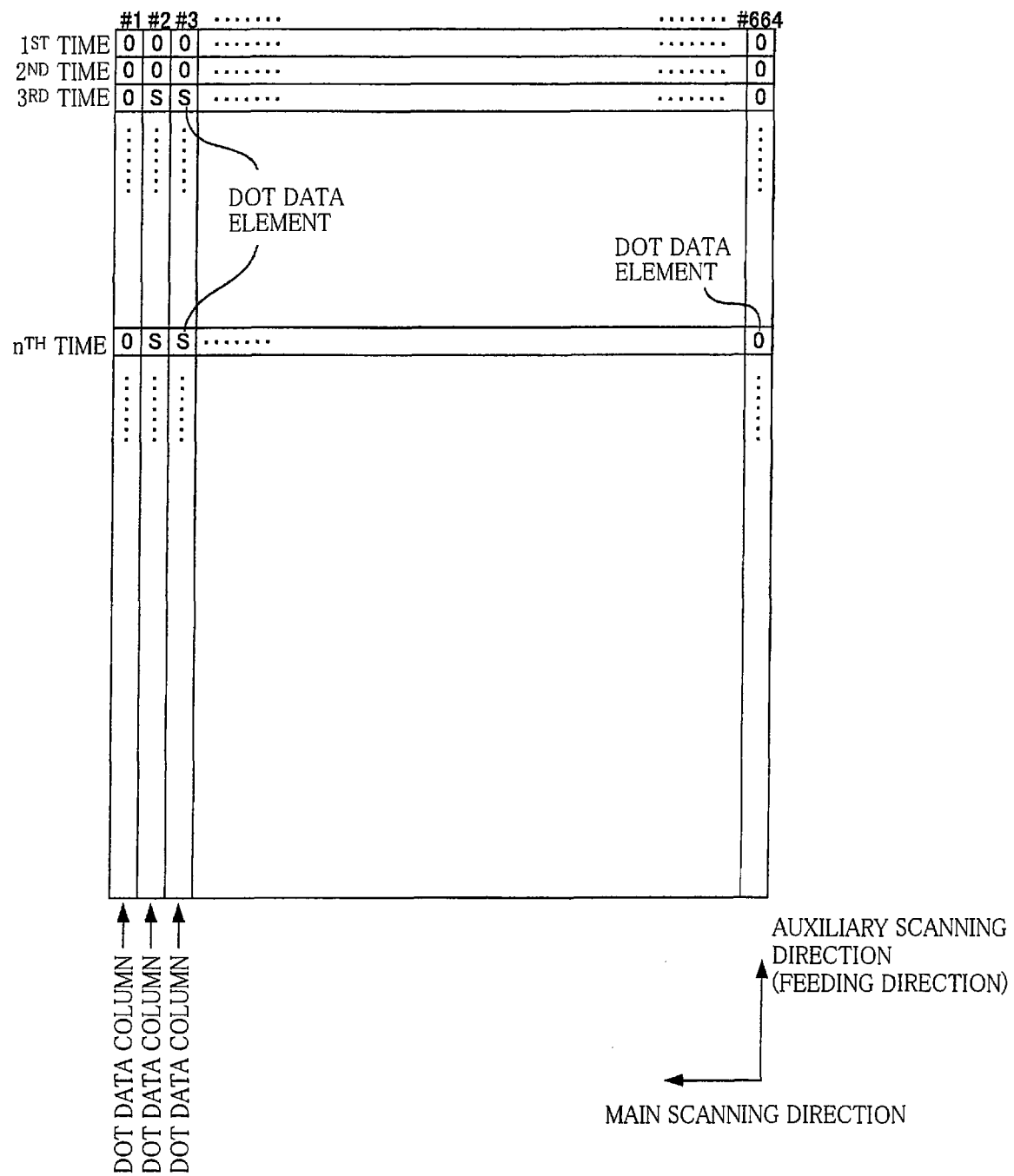
FIG. 6 illustrates a structure of image data stored in an image storing portion shown in FIG. 1.

There will be described a structure of the image data, with reference to FIGS. 6 and 7, in which FIG. 6 illustrates the structure of the image data, and FIG. 7 illustrates a relationship between the image data and the image formed on the recording sheet P fed in the inkjet printer 101. It is noted that FIG. 6 shows a part of the image data that corresponds to one of the nozzle groups u1-u4 in one inkjet head 1, and FIG. 7 schematically shows an arrangement of the nozzles 108 in each of the nozzle groups u1-u4. In FIGS. 6 and 7, the numbers of times, i.e., 1st-nth time, indicate the number of cycles of ink ejection as counted from the moment of initiation of recording. Hence, the image data stored in the image storing portion 31 has a structure such that 16 (=4×4) pieces of data, each of which has the structure shown in FIG. 6, are combined.

In the image data, dot data elements are sequenced. Each dot data element is a code of 2-bit indicative of the kind of a corresponding one of image dots forming the image data. That is, there are a predetermined plurality of kinds of image dots that respectively represent a predetermined plurality of ink density values that are determined by the number of ink droplets ejected from a corresponding one of the nozzles 108. In the present embodiment, a first kind of dot data element that is indicative of a value of ink density corresponding to a case where one ink droplet is ejected from the nozzle 108 is referred to as "SMALL" or "S", a second kind of dot data element indicative of a value of ink density corresponding to a case where two ink droplets are ejected is referred to as "MEDIUM" or "M", a third kind of dot data element in a case where three ink droplets are ejected is referred to as "LARGE (or L)", and a fourth kind of dot data element in a case where no ink droplets are ejected are referred to as "NULL (or N)". As shown in FIGS. 6 and 7, in the image data, dot data elements related or corresponding to all the nozzles 108 of the inkjet heads 1 (that is, the nozzles #1-#664 of the respective nozzle groups u1-u4 in all the inkjet heads 1) are sequenced to correspond to the cycles of ink ejection at the time of recording of the image on a recording sheet P.

The cycles of ink ejection determine the resolution in the auxiliary scanning direction of the image recorded on the recording sheet P. As the number of cycles of ink ejection increases, image dots corresponding to each nozzle 108 are formed to be sequentially arranged in the auxiliary scanning direction. The image dots are arranged at regular intervals corresponding to the resolution in the auxiliary scanning direction, and form an image dot column extending in the auxiliary scanning direction. In the image storing portion 31, the dot data elements are stored such that the dot data elements are arranged in the order of the cycles of ink ejection so as to correspond to the image dots thus formed adjacent to one another on the recording sheet P.

Referring back to FIG. 1, the template-data generating portion 32 generates template data from the image data stored in the image storing portion 31. More specifically, the template-data generating portion 32 generates the template data such that one of the first to fourth kinds of dot data elements that most frequently occurs in each of the image dot columns of the image data is initially determined, and then the most frequently occurring kinds of dot data elements thus determined are sequenced. Thus, the dot data elements sequenced in the template data correspond to the respective or different nozzles 108. In determining the most frequently occurring kind of dot data element in each image dot column of the image data, the template-data generating portion 32 extracts all the dot data elements in the image dot column and determines the most frequently occurring kind.

The data-block generating portion 33 generates head data block (data block) from the image data stored in the image storing portion 31 and the template data generated by the template-data generating portion 32. The head data block is data in which are sequenced a plurality of code sets. Each of the code sets corresponds to each cycle of ink ejection at the time of recording of the image on the recording sheet P. Each code in the code set is indicative of a difference of a dot data element (of one of the first to fourth kinds) in the image data corresponding to a nozzle 108 in an inkjet head 1, from a dot data element (of one of the first to fourth kinds) in the template data at a position corresponding to the former dot data element, i.e., the dot data element in the image data. That is, each code set corresponds to the differences with respect to all the dot data elements corresponding to all the nozzles 108 in each inkjet head 1. Thus, a code set is generated for every cycle of ink ejection, using the template data as a reference, with each code in the code set being a binarization of the difference between the template data and the image data with respect to a nozzle 108. In the head data block, the thus generated code sets of all the inkjet heads 1 are sequenced.

Figure 9:
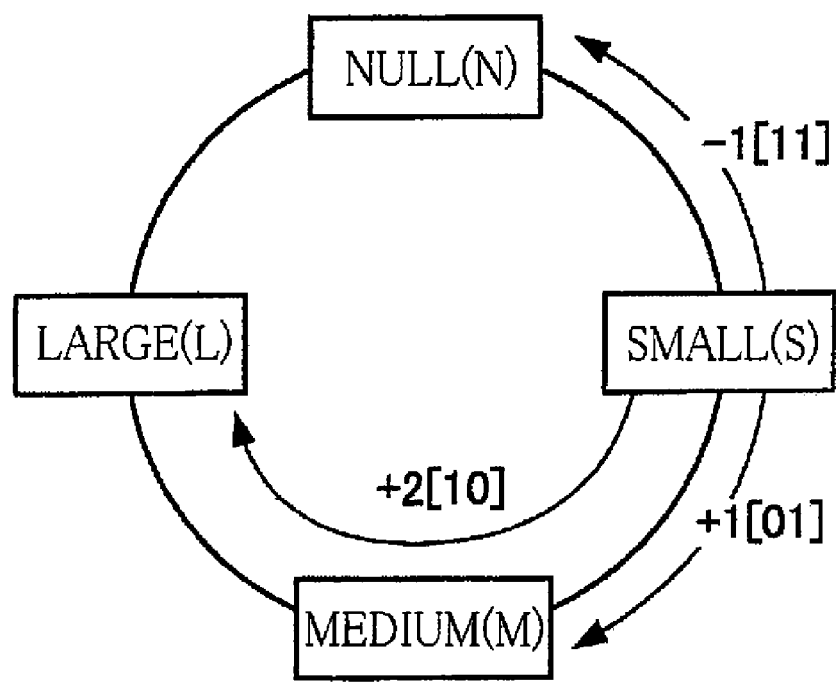
FIG. 9 illustrates an operation that the data-block generating portion implements in the generation of the head data block.

Referring now to FIGS. 8 and 9, there will be described an operation of the data-block generating portion 33. FIG. 8 illustrates the process in which the data-block generating portion 33 generates the head data block, and shows a part of the image data that corresponds to a single cycle of ink ejection. FIG. 9 is a diagram illustrating an operation that the data-block generating portion 33 implements when generating the head data block. As shown in FIG. 8, the data-block generating portion 33 compares a portion of the image data stored in the image storing portion 31, which portion corresponds to a cycle of ink ejection, with the template data generated by the template-data generating portion 32. That is, a dot data element in the portion of the image data that corresponds to a nozzle 108 (one of the nozzles #1-#664) and a dot data element in the template data that corresponds to the same nozzle 108 (the one of the nozzles #1-#664) are compared, and based on a result of the comparison, a code indicative of a difference between the dot data elements (or their kinds) in the image data and in the template data is generated. The code indicative of the difference is of two bits.

The code indicative of the difference is determined using a ring along which the above-described four kinds of dot data elements, namely, "SMALL (S)", "MEDIUM (M)", "LARGE (L)", and "NULL (N)", are arranged clockwise in the order of description. More specifically, when the dot data element in question in the image data does not differ in kind from the corresponding dot data element in the template data, in other words, when the former and latter dot data elements are identical in kind with each other, a code "00" is selected. This case or code functions as a starting point or a reference point. That is, the difference of the kind of the dot data element in the image data from the kind of the dot data element in the template data is represented by a difference in position on the ring between the kinds of these two dot data elements such that as the number of steps by which the position of the kind of the dot data element in the image data clockwise differs, or is remote, from the position of the kind of the dot data element in the template data increases by one, the value of the code is incremented by one, starting from "00", and as the number of steps by which the position of the kind of the dot data element in the image data counterclockwise differs or is remote from the position of the kind of the dot data element in the template data increases by one, the value of the code is decremented by one, starting from "00". For instances, in a case where the kind of a dot data element in the template data (referred to as "the former dot data element") is "S" and the kind of a dot data element (referred to as "the latter dot data element") of an image dot in the image data corresponding to the former dot data element is "M", the difference in position on the ring between the kinds of the former and latter dot data elements is one clockwise step, and thus a code "01" is selected or applies In another case where the kind of the former dot data element is "S" and the kind of the latter dot data element is "L", the difference in position on the ring therebetween is two counterclockwise steps, and thus a code "10" applies. In still another case where the kinds of the former and the latter dot data elements are "S" and "N", respectively, the difference in position on the ring therebetween is one counterclockwise step, and thus a code "11" applies.

As described above, according to the embodiment, a plurality of values (S, M, L, N) of ink ejection amount are predetermined, and an amount of ink to be actually ejected during recording is identified by specifying the direction and the degree (i.e., the number of steps) of the difference between the values of ink ejection amount respectively indicated by the image data and the template data. Digitization of the direction and the degree of difference is realized by defining a specific relationship among the predetermined values of ink ejection amount, or a specific way in which the values of ink ejection amount are correlated or associated with one another.

In this embodiment, each of the predetermined values of ink ejection amount is directly associated only with other two of the predetermined values. With the rest of the predetermined values, each predetermined value is associated only via the two directly associated values. Hence, one of the values (first value) of ink ejection amount different from another value as a reference value (second value) is identified or specified by specifying the direction and the number of steps in and by which the first value differs from the second value via one of the two directly associated values. The direction can be either of two opposite directions, that is, in whichever direction the first and second values differ from each other, it is possible to specify the first value in relation to the second value. In this way, assuming the ring of relationship through which the predetermined values of ink ejection amount are associated with one another, the direction of the difference between the value of ink ejection amount by which the ink is to be actually ejected and the value of the template data (i.e., the reference value) can be expressed by the direction in which the first and second values of ink ejection amounts are presumed to be remote from each other on the ring, which is one of the clockwise and counterclockwise directions, and the degree of the difference can be expressed by the number of values interposed between the first and second values on the ring. For instance, when the direction of the difference is presumed to be clockwise, in other words, when the number of values interposed between the first and second values are counted in the clockwise direction, the degree of the difference is represented in a positive number, and when the number of interposed values is n, the degree of the difference is expressed as a value (n+1).

To more clarify the way of determining the code, there will be described a specific case of FIG. 8. When the dot data elements in the image data that correspond to image dots of the nozzles #1-#5, #663 and #664, and the dot data elements in the template data corresponding to the same nozzles #1-#5, #663 and #664, are respectively compared with each other, the kinds of the dot data elements with respect to each nozzle #1-#5, #663 and #664 are identical between the image data and the template data. Hence, the data-block generating portion 33 determines that codes indicative of the differences of the kinds of the dot data elements in the image data from the kinds of the respectively corresponding dot data elements in the template data are all "00". On the other hand, the kinds of dot data elements in the image data corresponding to the nozzles #6, #7 and #642 are not identical with the kinds of dot data elements in the template data corresponding to the same nozzles #6, #7 and #642, that is, as seen in the ring of FIG. 9, the position of the kind of each of the former dot data elements clockwise differs by one step from the position of the kind of a corresponding one of the latter dot data elements. Namely, as to the nozzles #6 and #7, the kind of the dot data elements is "S" in the template data and "M" in the image data, and as to the nozzle #662, the kind of the dot data element is "N" in the template data and "M" in the image data. Hence, with respect to the nozzles #6 and #7, the data-block generating portion 33 determines that codes indicative of the differences of the kinds of the former dot data elements from the kinds of the latter dot data elements are "01". When the codes for all the dot data elements in the image data have been determined as described above, generation of the head data block is complete. Since the template data is a sequence of the kinds of dot data elements most frequently occurring in the respective image dot columns that correspond to the respective nozzles 108, a frequency of occurrence of the code "00" in the head data block is high.

Referring back to FIG. 1, the combining portion 34 generates a head data block group by sequentially combining the head data blocks that are generated by the data-block generating portion 33 to correspond to respective cycles of ink ejection. The order in which the head data blocks are combined is not limited to an order corresponding to the cycles of ink ejection. Further, it is not essential that the head data blocks corresponding to an entirety of the image data are sequentially combined, but the head data block group may be generated by sequentially combining head data blocks corresponding to only a part of image data of an entire image, such as image data of half a page. As described above, the frequency of occurrence of the code "00" in the head data block is high, and thus a frequency of occurrence of the code "00", in the head data block group is also high. The data compressing portion 35 creates a compressed file by compressing by run-length method the head data block group generated by the combining portion 34. The run-length method is a data compression method according to which when a code appears consecutively in data, the consecutive sequence is expressed by a combination of the code itself and the times the code appears consecutively in the sequence. The USB controller 36 sends the compressed file created by the data compressing portion 35 to the inkjet printer 101.

As has been illustrated above, in the control apparatus 16, the template-data generating portion 32 generates the template data from the image data, the data-block generating portion 33 generates the head data blocks corresponding to the respective cycles of ink ejection from the image data and the template data, and the combining portion 34 generates the head data block group by combining the head data blocks to correspond to the cycles of ink ejection. Then, the data compressing portion 35 creates the compressed file by compressing the head data block group, and the USB controller 36 sends the compressed file created by the data compressing portion 35 to the inkjet printer 101.

According to the embodiment where the template data is a sequence of the most frequently occurring kinds of dot data elements in the respective image dot columns corresponding to the respective nozzles 108, the frequency of occurrence of the code "00" in the head data block is high, and the frequency of occurrence of the code "00" in the head data block group is also high. By thus increasing the frequency of occurrence of a code in the head data block group, efficiency in compressing the head data block group by the data compressing portion 35 is enhanced. This in turn reduces the time necessary for data transmission to the inkjet printer 101.

Although there has been described one embodiment of the invention, it is to be understood that the invention is not limited to the details of the embodiment, but may be otherwise embodied with various modifications and improvements that may occur to those skilled in the art, without departing from the scope and spirit of the invention defined in the appended claims.

For instance, in the above-described embodiment, each code in the head data block that is indicative of the difference of the kind of a dot data element in the image data from the kind of the corresponding dot data element in the template data is determined such that the value of the code is incremented by one from "00", which is a reference value indicative of no difference between the image data and the template data, as the number of steps by which the kind of the dot data element in the image data clockwise differs from the kind of the dot data element in the template data increases by one along the ring on which the values of ink ejection amount "S,", "L" and "N" are sequentially arranged clockwise, and the value of the code is decremented by one from "00" as the number of steps by which the kind of the dot data element in the image data counterclockwise differs from the kind of the dot data element in the template data increases by one along the ring. However, the code indicative of the difference of the dot data element in the image data from the dot data element in the template data may be otherwise determined. For instance, the embodiment may be modified such that a plurality of codes corresponding to all the possible patterns of difference between the dot data elements in the image data and the dot data elements in the template data are predetermined, and the head data block is generated by selecting and sequencing the relevant codes.

Further, the code may not be of two bits, but may be of one bit or three or more bits.

In the above-described embodiment, the head data block group generated by sequentially combining the head data blocks is compressed and sent. However, the embodiment may be modified such that a single head data block is compressed and sent, without being combined with any other head data block.

In the above-described embodiment, the head data block group is generated by sequentially combining the head data blocks that are generated to correspond to the cycles of ink ejection. However, the embodiment may be modified such that each data row made up of dot data elements respectively corresponding to all the nozzles 108 is extracted, and a head data block is generated by sequencing codes each indicative of a difference of each of the dot data elements in the data row from a corresponding one of dot data elements in the template data. An example of this modification is shown in FIG. 10.

In the above-described embodiment, run-length method is employed when the data compressing portion 35 compresses the head data block group. However, other methods than run-length method such as entropy method or universal method may be employed. When the data compression is implemented using entropy or universal method, the efficiency of data compression is relatively high in the case of a head data block in which a frequency of occurrence of a code is high.

Further, although in the above-described embodiment the nozzles 108 are arranged in a matrix in the ink ejection surface 2a of the inkjet head 1, the nozzles 108 may be otherwise arranged as desired. For instance, the nozzles may be arranged linearly with respect to the main scanning direction.

In the above-described embodiment, the control apparatus 16 sends the compressed file to the inkjet printer via the USB controller 36. However, the compressed file may be sent to the inkjet printer 101 by other communication means than using a USB connection.

In the above-described embodiment, the control apparatus 16 is realized by executing the control program on the PC. However, the control apparatus 16 may be realized by executing the control program on a computer which is not a PC.

What is claimed is:

1. A data transmission apparatus for transmitting image data to an inkjet recording apparatus including (a) a feeding device which feeds a recording medium in a feeding direction, and (b) a line-type inkjet head which extends in a direction perpendicular to the feeding direction and across the recording medium fed in the feeding direction, and has an ink ejection surface in which a plurality of ink ejection openings are formed, the image data being related to an image to be recorded on the recording medium by the inkjet recording apparatus, and being constituted by a plurality of dot data elements respectively corresponding to a plurality of image dots of the image, the plurality of image dots being arranged in a plurality of rows and a plurality of columns, each row of the plurality of rows being parallel to a first direction and each column of the plurality of columns being parallel to a second direction, the first direction being perpendicular to the feeding direction and the second direction being parallel to the feeding direction, and each of the dot data elements being one of a predetermined plurality of kinds, the data transmitting apparatus comprising:

a storing portion which stores the image data;

a template-data generating portion which generates template data from the image data stored in the storing portion, by determining a most frequent kind of the predetermined plurality of kinds within each column of the plurality of columns or within each row of the plurality of rows, and arranging the template data, such that a portion of the template data corresponding to each element of each column of the plurality of columns represents the most frequent kind determined within that column or such that a portion of the template data corresponding to each element of each row of the plurality of rows represents the most frequent kind determined within that row, wherein the template-data generating portion determines the most frequent kind within each column based on which of the predetermined plurality of kinds occurs most frequently among the dot data elements arranged in the column when determining the most frequent kind of the predetermined plurality of kinds within each column of the plurality of columns, and wherein the template-data generating portion determines the most frequent kind within each row based on which of the predetermined plurality of kinds occurs most frequently among the dot data elements arranged in the row when determining the most frequent kind of the predetermined plurality of kinds within each row of the plurality of rows;

a data-block generating portion which generates a data block by determining a difference between the kind of each dot data element of the image data and the kind of the portion of the template data corresponding to that dot data element, generating a plurality of codes, wherein each code of the plurality of codes is based on a determined difference between the kind of a corresponding dot data element of the image data and a kind of the portion of the template data corresponding to the corresponding dot data element, and arranging each code of the plurality of codes, such that a sequence of the plurality of codes corresponds to a sequence of corresponding dot data elements of the image data stored in the storing portion;

a compressing portion which compresses the data block generated by the data-block generating portion to create a compressed file; and a transmitting portion which transmits the compressed file to the inkjet recording apparatus.

2. The data transmission apparatus according to claim 1, wherein the columns are respectively associated with the ink ejection openings, and the template-data generating portion initially determines the kind of dot data element that most frequently occurs in each of the columns and then sequences the kinds of dot data elements to correspond to at least a part of the ink ejection openings, and wherein the data-block generating portion generates the data block such that the codes are sequenced to correspond to one cycle of ink ejection in recording of the image on the recording medium by the inkjet recording apparatus.

3. The data transmission apparatus according to claim 2, wherein each of the dot data elements is of a plurality of bits and representative of one of a plurality of binary numbers that are indicative of respective predetermined values of an ink ejection amount by which ink is to be ejected from one of the ink ejection openings corresponding to an image dot, and wherein the template-data generating portion generates the template data by sequencing the binary numbers that the kinds of dot data elements most frequently occurring in the respective columns are representative of, so as to correspond to at least a part of the ink ejection openings.

4. The data transmission apparatus according to claim 3, wherein the binary number which each of the values of the ink ejection amount by which the ink is to be ejected from the ink ejection opening corresponding to the image dot is representative of is of two bits.

5. The data transmission apparatus according to claim 3, wherein the data-block generating portion generates the data block by obtaining, as the difference between the dot data element in the image data and the dot data element in the template data, a number of steps by which the binary numbers that the dot data elements in the image data and the template data are respectively representative of are remote from each other on a ring in which the binary numbers respectively associated with the values of the ink ejection amount are arranged in an order, the number of steps being represented in a positive number when counted in one of opposites directions along the ring and represented in a negative number when counted in the other of opposites directions along the ring.

6. The data transmission apparatus according to claim 2, further comprising a combining portion which generates a data-block group by combining a plurality of the data blocks that are generated by the data-block generating portion and respectively correspond to a plurality of cycles of ink ejection.

7. The data transmission apparatus according to claim 6, wherein the compressing portion compresses the data-block group generated by the combining portion by run-length method.

8. The data transmission apparatus according to claim 2, wherein the compressing portion compresses the data block by run-length method.

9. A nonvolatile medium storing a data transmission program for having a computer transmit image data to an inkjet recording apparatus including (a) a feeding device which feeds a recording medium in a feeding direction, and (b) a line-type inkjet head which extends in a direction perpendicular to the feeding direction and across the recording medium fed in the feeding direction, and has an ink ejection surface in which a plurality of ink ejection openings are formed, the image data being stored in a storing portion of the computer, being related to an image to be recorded on the recording medium by the inkjet recording apparatus, and being constituted by a plurality of dot data elements respectively corresponding to a plurality of image dots of the image, the plurality of image dots being arranged in a plurality of rows and a plurality of columns, each row of the plurality of rows being parallel to a first direction and each column of the plurality of columns being parallel to a second direction, the first direction being perpendicular to the feeding direction and the second direction being parallel to the feeding direction, and each of the dot data elements being one of a predetermined plurality of kinds, the data transmitting program comprising:

a template-data generating process for generating template data from the image data stored in the storing portion, by determining a most frequent kind one of the predetermined plurality of kinds within each column of the plurality of columns or within each row of the plurality of rows, and arranging the template data, such that a portion of the template data corresponding to each element of each column of the plurality of columns represents the most frequent kind determined within that column or such that a portion of the template data corresponding to each element of each row of the plurality of rows represents the most frequent kind determined within that row, wherein the template-data generating process further comprises determining the most frequent kind within each column based on which of the predetermined plurality of kinds occurs most frequently among the dot data elements arranged in the column when determining the most frequent kind of the predetermined plurality of kinds within each column of the plurality of columns, and wherein the template-data generating process further comprises determining the most frequent kind within each row based on which of the predetermined plurality of kinds occurs most frequently among the dot data elements arranged in the row when determining the most frequent kind of the predetermined plurality of kinds within each row of the plurality of rows;

a data-block generating process for generating a data block by determining a difference between the kind of each dot data element of the image data and the kind of the portion of the template data corresponding to that dot data element, generating a plurality of codes, wherein each code of the plurality of codes is based on a determined difference between the kind of a corresponding dot data element of the image data and a kind of the portion of the template data corresponding to the corresponding dot data element, and arranging each code of the plurality of codes, such that a sequence of the plurality of codes corresponds to a sequence of corresponding dot data elements of the image data stored in the storing portion;

a compressing process for compressing the data block generated by the data-block generating process to create a compressed file; and a transmitting process for transmitting the compressed file to the inkjet recording apparatus.

\* \* \* \* \*